(12) United States Patent
Diehl et al.

(10) Patent No.: US 10,919,492 B1
(45) Date of Patent: *Feb. 16, 2021

(54) SYSTEMS AND METHODS OF USING PIEZOELECTRIC SENSORS FOR THEFT DETECTION OF ENCLOSURES

(71) Applicant: Pony AI Inc., Grand Cayman (KY)

(72) Inventors: Peter G. Diehl, Shanghai (CN); Cheng Jin, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,240

(22) Filed: Jun. 11, 2020

Related U.S. Application Data

(63) Continuation of application No. 16/522,571, filed on Jul. 25, 2019, now Pat. No. 10,717,411.

(51) Int. Cl.
| | | |
|---|---|---|
| G05D 1/02 | (2020.01) | |
| B60R 25/104 | (2013.01) | |
| B60R 25/102 | (2013.01) | |
| G01L 1/16 | (2006.01) | |
| H04W 4/029 | (2018.01) | |
| B60R 25/01 | (2013.01) | |
| H04W 4/48 | (2018.01) | |
| G01S 19/16 | (2010.01) | |
| B60R 25/30 | (2013.01) | |
| H04N 7/18 | (2006.01) | |
| G01S 7/481 | (2006.01) | |
| B60R 25/10 | (2013.01) | |
| G01S 17/86 | (2020.01) | |

(52) U.S. Cl.
CPC ............ *B60R 25/104* (2013.01); *B60R 25/01* (2013.01); *B60R 25/102* (2013.01); *B60R 25/305* (2013.01); *G01L 1/16* (2013.01); *G01S 19/16* (2013.01); *H04N 7/188* (2013.01); *H04W 4/029* (2018.02); *H04W 4/48* (2018.02); *B60R 2025/1013* (2013.01); *G01S 7/4813* (2013.01); *G01S 17/86* (2020.01); *G05D 1/027* (2013.01); *G05D 1/0231* (2013.01); *G05D 1/0255* (2013.01); *G05D 1/0278* (2013.01); *G05D 1/0291* (2013.01); *G05D 2201/0213* (2013.01)

(58) Field of Classification Search
CPC ..... B60R 25/104; B60R 25/01; B60R 25/102; B60R 25/305; B60R 2025/1013; H04W 4/48; H04W 4/029; G01L 1/16; G01S 19/16; G01S 17/86; G01S 7/4813; H04N 7/188; G05D 1/0231; G05D 1/0255; G05D 1/0278; G05D 1/0291; G05D 2201/0213
See application file for complete search history.

(56) References Cited

U.S. PATENT DOCUMENTS

| | | |
|---|---|---|
| 5,656,998 A | 8/1997 | Fujiuchi |
| 7,646,287 B2 | 1/2010 | Hayashi |

(Continued)

*Primary Examiner* — Munear T Akki
(74) *Attorney, Agent, or Firm* — Sheppard Mullin Richter & Hampton LLP

(57) ABSTRACT

Systems and methods are provided for detecting theft of an enclosure of an autonomous vehicle. Pressure exerted by the enclosure to a fixture as measured by one or more piezoelectric sensors can be monitored. A change in the pressure exerted by the enclosure as measured by the one or more piezoelectric sensors can be detected. An alert can be generated based on the change in the pressure.

20 Claims, 9 Drawing Sheets

(56) References Cited

U.S. PATENT DOCUMENTS

| | | |
|---|---|---|
| 2013/0041623 A1 | 2/2013 | Kumar |
| 2013/0229274 A1 | 9/2013 | Kumar |
| 2017/0261273 A1* | 9/2017 | Maranville ............... F28F 7/02 |
| 2018/0107221 A1* | 4/2018 | Droz ....................... G01S 17/89 |
| 2018/0222450 A1* | 8/2018 | Kunze ...................... B60S 1/56 |
| 2018/0265019 A1* | 9/2018 | Dry .................... B60R 16/0232 |
| 2019/0210567 A1* | 7/2019 | Frederick ................ B60R 25/34 |
| 2019/0361094 A1* | 11/2019 | Harris ..................... G01S 17/87 |

* cited by examiner

SYSTEMS AND METHODS OF USING PIEZOELECTRIC SENSORS FOR THEFT DETECTION OF ENCLOSURES

CROSS-REFERENCE TO RELATED APPLICATION

This application is a continuation of U.S. application Ser. No. 16/522,571, filed Jul. 25, 2019, the content of which is incorporated herein by reference in its entirety.

FIELD OF THE INVENTION

This disclosure relates to autonomous vehicles. More particularly, this disclosure relates to theft detection of an enclosure of an autonomous vehicle.

BACKGROUND

In general, an autonomous vehicle (e.g., a driverless vehicle, a semi-autonomous vehicle, etc.) can have myriad sensors onboard the autonomous vehicle. For example, the myriad sensors can include light detection and ranging sensors (LiDARs), radars, cameras, etc. The myriad sensors can play a central role in functioning of the autonomous vehicle. For example, a LiDAR can be utilized to detect and identify objects (e.g., other vehicles, road signs, pedestrians, buildings, etc.) in a surrounding. The LiDAR can also be utilized to determine relative distances of the objects to the LiDAR in the surrounding. As another example, radars can be utilized to aid with collision avoidance, adaptive cruise control, blind side detection, etc. As yet another example, cameras can be utilized to recognize, interpret, and/or analyze contents or visual cues of objects. Data collected from these sensors can then be processed and used, as inputs, to make driving decisions. In general, sensors onboard an autonomous vehicle are expensive or economically costly, and thus, may be subject to theft.

SUMMARY

Various embodiments of the present disclosure can include systems and methods configured for detecting theft of an enclosure of an autonomous vehicle. Pressure exerted by the enclosure to a fixture as measured by one or more piezoelectric sensors can be monitored. A change in the pressure exerted by the enclosure as measured by the one or more piezoelectric sensors can be detected. An alert can be generated based on the change in the pressure.

In some embodiments, the enclosure can be tracked using a GPS of the enclosure.

In some embodiments, a first pressure exerted by the enclosure at a first time can be measured. A second pressure exerted by the enclosure at a second time. The second time being later than the first time. A difference between the first pressure and the second pressure can be determined. The different can satisfy a threshold pressure.

In some embodiments, a first pressure exerted by the enclosure at a first time can be measured. A second pressure exerted by the enclosure at a second time. The second time being later than the first time. A rate of change from the first pressure to the second pressure can be determined. The rate of change can satisfy a threshold rate.

In some embodiments, the alert can be an audio based alert.

In some embodiments, the audio based alert can be a loud, ear piercing sound.

In some embodiments, the alert can be an electric signal, sent over a network, that informs an autonomous vehicle fleet operator the change in pressure exerted by the enclosure.

In some embodiments, the alert can include turning on headlights and taillights of the autonomous vehicle.

In some embodiments, the alert can be automatically sent to governmental authorities.

In some embodiments, the alert can include instructing cameras encased in the enclosure to take photos of a surrounding.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1A:
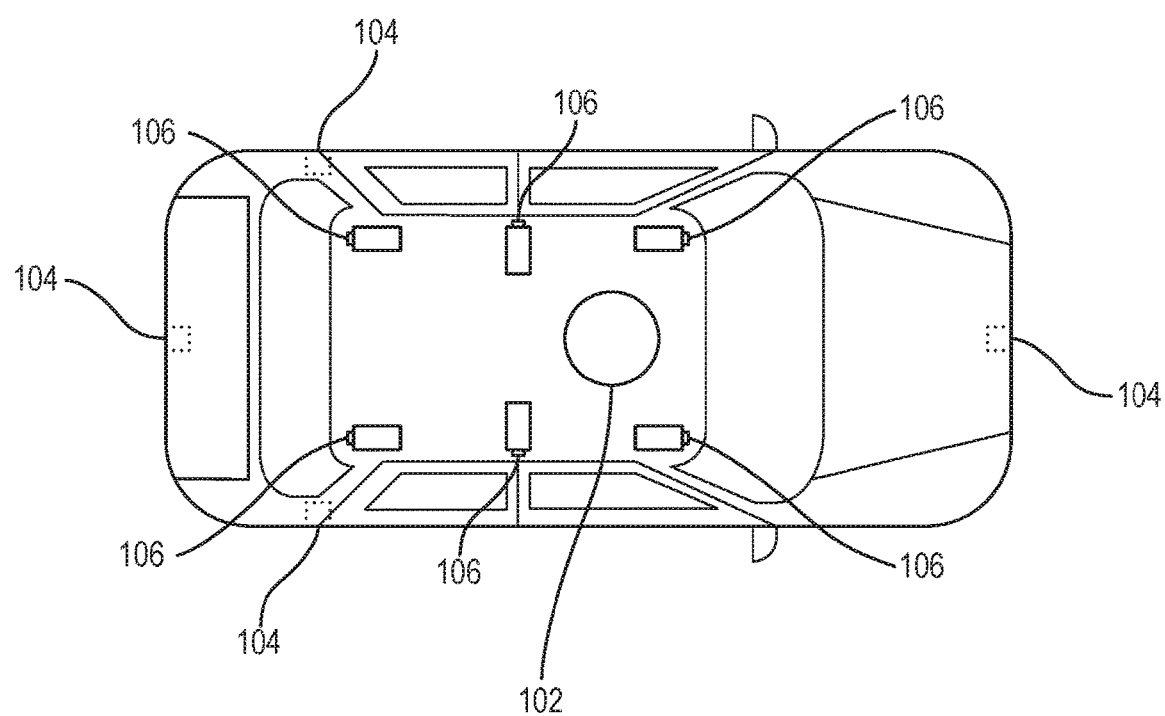
FIG. 1A illustrates an example autonomous vehicle, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, an autonomous vehicle (e.g., a driverless vehicle, a semi-autonomous vehicle, etc.) can have myriad sensors onboard the autonomous vehicle. The myriad sensors can include light detection and ranging sensors (LiDARs), radars, cameras, global positioning systems (GPS), sonars, inertial measurement units (IMUs), accelerometers, gyroscopes, magnetometers, far infrared sensors (FIR), etc. The myriad sensors can play a central role in functioning of the autonomous vehicle. For example, a LiDAR can be utilized to detect and identify objects (e.g., other vehicles, road signs, pedestrians, buildings, etc.) in a surrounding. The LiDAR can also be utilized to determine relative distances of the objects to the LiDAR in the surrounding. As another example, radars can be utilized to aid with collision avoidance, adaptive cruise control, blind side detection, assisted parking, etc. As yet another example, cameras can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

In general, sensors onboard an autonomous vehicle are highly calibrated or aligned. This means placement of sensors with respect to the autonomous vehicle need to be known within a high degree of confidence. Any deviation from the placement of sensors can lead to unreliable data. For example, a LiDAR relies on speed of light and position of laser beams to determine relative distances and locations of objects in a three dimensional surrounding. Data collected by the LiDAR is highly dependent (or calibrated) to a specific location to which the LiDAR is placed. Depending on where the LiDAR is located, the distances and the locations of the objects, as determined by the LiDAR, can vary. For instance, time it takes for a reflected light to reach a LiDAR located in the front of the autonomous vehicle will be different from time it takes for the same reflected light to reach a LiDAR located in the back of the autonomous vehicle. This slight time difference, in some cases, can make the distance and the location determinations not reliable for use in guiding the autonomous vehicle. To minimize number of sensor alignments, sensors, such as LiDARs and cameras, can be encased in an enclosure. The enclosure allows the sensors to be removed from one autonomous vehicle and installed to another autonomous vehicle with ease and without numerous alignments. For example, instead of removing sensors from one vehicle, and installing and aligning the sensors to another vehicle individually in multiple acts, an enclosure containing various sensors can be removed from one vehicle, and the enclosure can be installed and aligned to another vehicle in a single act. Thus, simplifying sensor alignments. The enclosure can be affixed to a fixture on the roof (e.g., the top) of the autonomous vehicle using mechanical coupling devices (e.g., screws, nuts and bolts, rivets, etc.). These mechanical coupling devices can be tightened to a specific torque value to ensure that the enclosure is properly secured onto the fixture, and thus the autonomous vehicle. In various embodiments, one or more piezoelectric sensors can be used to measure torque values corresponding to the mechanical coupling devices used to secured the enclosure. One drawback of encasing sensors in an enclosure is ease of theft. Sensors encased by the enclosure generally tend to be expensive or economically costly. The fact that the enclosure is affixed externally to an autonomous vehicle may subject the enclosure to potential theft. For example, when left unattended, a person can use various means to forcibly remove an enclosure containing various sensors of the autonomous vehicle. Under conventional approaches, security personnel can be deployed to patrol a premise on which autonomous vehicles are stationed. In some cases, fencing can be erected around the premise to provide additional safeguard against theft. However, such approaches to safeguard sensors of the autonomous vehicle from theft is cumbersome, costly, and inefficient. Accordingly, conventional approaches to prevent theft are not ideal.

The disclosed technology alleviates this and other problems under the conventional approaches. In various embodiments, the disclosed technology can utilize one or more piezoelectric sensors to measure torque values associated with one or more mechanical coupling devices (e.g., screws, nuts and bolts, rivets, fasteners, etc.) used to secure an enclosure to a fixture of an autonomous vehicle. The enclosure can be placed onto the fixture. The enclosure can be translated along an axis of the fixture. For example, the enclosure can move or glide forward or backward on the fixture along the body of the autonomous vehicle. In some embodiments, the enclosure can have one or more mounting points through which the one or more mechanical coupling devices are used to secure the enclosure. Each mounting point can be associated with a piezoelectric sensor. For example, an enclosure can have four mounting points that are used to secure the enclosure to a fixture. In this example, there can be a piezoelectric sensor at or near each mounting point on the enclosure. In general, a piezoelectric sensor can measure pressure between any two surfaces. For example, a piezoelectric sensor disposed between an enclosure and a fixture can measure pressure exerted by the enclosure to the fixture. Once the enclosure is translated to a final alignment location on the fixture, initial pressure measurements from the one or more piezoelectric sensors of the enclosure can be "zeroed" or set to an initial value. As the one or more mechanical coupling devices are tightened to secure the enclosure to the fixture, pressure exerted by the enclosure to the fixture increases. This pressure can be measured by the one or more piezoelectric sensors and converted into corresponding torque values associated with the one or more mechanical coupling devices. In some embodiments, once the one or more mechanical coupling devices are tightened to a specific torque value as indicated by the pressure measurement, an audio or visual cue can be emitted to signify that the one or more mechanical coupling devices are at their proper torque values. In some embodiments, the one or more piezoelectric can be utilized for enclosure theft detection. Various embodiments are discussed herein in greater detail.

FIG. 1A illustrates an example autonomous vehicle 100, according to an embodiment of the present disclosure. An autonomous vehicle 100 generally refers to a category of vehicles that are capable of sensing and driving in a surrounding by itself. The autonomous vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The autonomous vehicle 100 can also include myriad actuators to propel and navigate the autonomous vehicle 100 in the surrounding. Such actuators may include, for example, any suitable electro-mechanical devices or systems to control a throttle response, a braking action, a steering action, etc. In some embodiments, the autonomous vehicle 100 can recognize, interpret, and analyze road signs (e.g., speed limit, school zone, construction zone, etc.) and traffic lights (e.g., red light, yellow light, green light, flashing red light, etc.). For example, the autonomous vehicle 100 can adjust vehicle speed based on speed limit signs posted on roadways. In some embodiments, the autonomous vehicle 100 can determine and adjust speed at which the autonomous vehicle 100 is traveling in relation to other objects in the surrounding. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on the conventional vehicle. The autonomous vehicle 100 can also sense environmental conditions, gauge spatial relationships (e.g., distances between objects and itself), detect and analyze road signs just as the human driver. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include a LiDAR 102, radars 104, cameras 106, GPSs, sonars, ultrasonic, IMUs, accelerometers, gyroscopes, magnetometers, FIRs, and/or the like. The one or more sensors allow the autonomous vehicle 100 to sense a surrounding around the autonomous vehicle 100. For example, the LiDARs 102 can be configured to generate a three-dimensional map of the surrounding. The LiDARs 102 can also be configured to detect objects in the surrounding. As another example, the radars 104 can be configured to determine distances and speeds of objects around the autonomous vehicle 100. As yet another example, the cameras 106 can be configured to capture and process image data to detect and identify objects, such as road signs, as well as analyzing content of the objects, such as speed limit posted on the road signs.

In the example of FIG. 1A, the autonomous vehicle 100 is shown with the LiDAR 102 mounted to a roof or a top of the autonomous vehicle 100. The LiDAR 102 can be configured to generate three dimensional maps and detect objects in the surrounding. In the example of FIG. 1A, the autonomous vehicle 100 is shown with four radars 104. Two radars are directed to the front-side and the back-side of the autonomous vehicle 100, and two radars are directed to the right-side and the left-side of the autonomous vehicle 100. In some embodiments, the front-side and the back-side radars can be configured for adaptive cruise control and/or accident avoidance. For example, the front-side radar can be used by the autonomous vehicle 100 to maintain a safe distance from a vehicle ahead of the autonomous vehicle 100. As another example, if the vehicle ahead experiences a sudden reduction in speed, the autonomous vehicle 100 can detect this sudden change in motion, using the front-side radar, and adjust its vehicle speed accordingly. In some embodiments, the right-side and the left-side radars can be configured for blind-spot detection. In the example of FIG. 1A, the autonomous vehicle 100 is shown with six cameras 106. Two cameras are directed to the front-side of the autonomous vehicle 100, two cameras are directed to the back-side of the autonomous vehicle 100, and two cameras are directed to the right-side and the left-side of the autonomous vehicle 100. In some embodiments, the front-side and the back-side cameras can be configured to detect, identify, and determine objects, such as cars, pedestrian, road signs, in the front and the back of the autonomous vehicle 100. For example, the front-side cameras can be utilized by the autonomous vehicle 100 to identify and determine speed limits. In some embodiments, the right-side and the left-side cameras can be configured to detect objects, such as lane markers. For example, side cameras can be used by the autonomous vehicle 100 to ensure that the autonomous vehicle 100 drives within its lane.

Figure 1B:
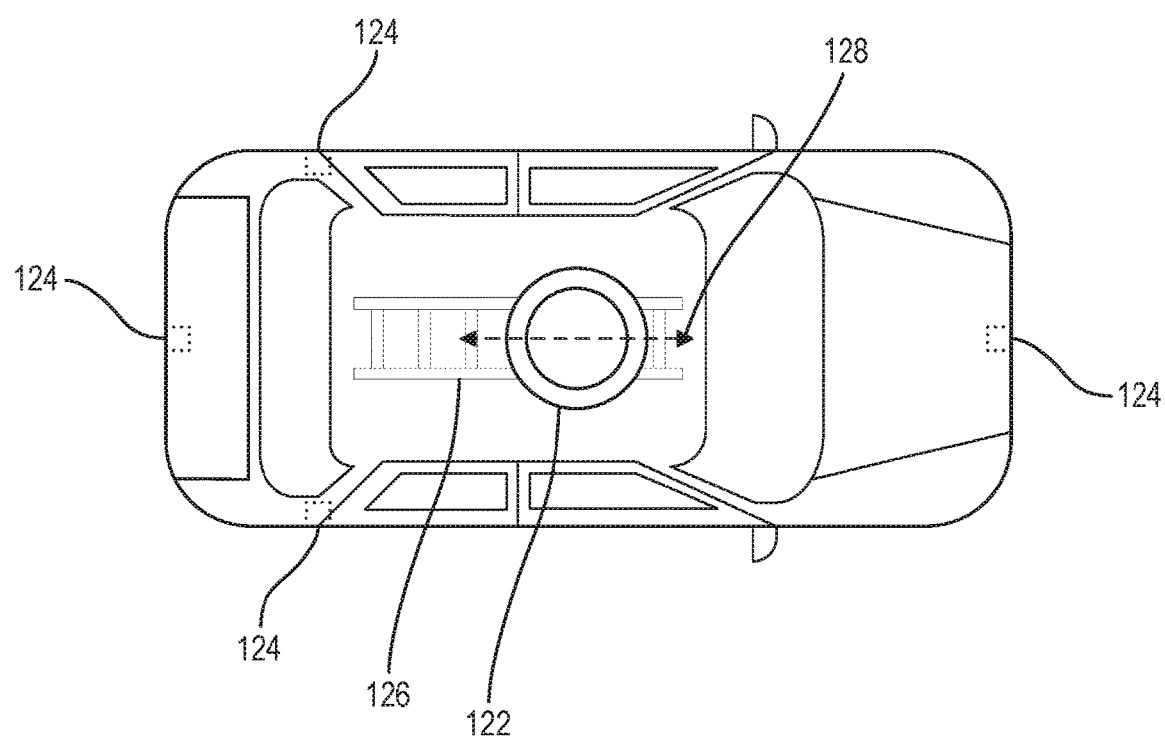
FIG. 1B illustrates an another example autonomous vehicle, according to an embodiment of the present disclosure.

FIG. 1B illustrates an another example autonomous vehicle 120, according to an embodiment of the present disclosure. In the example of FIG. 1B, the autonomous vehicle 120 is shown with an enclosure 122 and four radars 124. The enclosure 122 is mounted onto a fixture 126. In some embodiments, the fixture 126 can be a roof rack or a custom rack fitted to the autonomous vehicle 120. The enclosure 122, when mounted onto the fixture 126, can translate along a linear axis 128. For example, once mounted onto the fixture 126, the enclosure 122 can be adjusted to move in a forward or a backward direction with respect to the autonomous vehicle 120, along the linear axis 128 of the fixture 126. In some embodiments, the enclosure 122 can be moved along a nonlinear axis. In one embodiments, the enclosure 122 can include a LiDAR, a plurality of radars and cameras, and their associated electronics. In another embodiment, the enclosure 122 can include a LiDAR, a plurality of cameras, and their associated electronics. Many variations are possible. The enclosure 122 allows sensors to be packaged compactly or tightly and to be moved from one vehicle to another easily. In various embodiments, the enclosure 122 can be made from any materials that are transparent to electromagnetic waves emitted by or receptive to the sensors encased in the enclosure 122. In various embodiments, an outer cover of the enclosure 122 can be made from tempered glass, plexiglass, chemically strengthened glass, and the likes.

In some embodiments, the enclosure 122 can include one or more piezoelectric sensors. The one or more piezoelectric sensors can measure pressure (or strain) between any two surfaces. A piezoelectric sensor is a type of sensor that converts pressure into electrical signal. The electrical signal can be digitized and analyzed by a computing system to determine torque values corresponding to the pressure between two surfaces. In some embodiments, a piezoelectric sensor can be disposed, in-line, between the enclosure 122 and the fixture 126, or beneath the enclosure 122. In such embodiments, one side of the piezoelectric sensor makes a contact with the enclosure 122 and the other side of the piezoelectric sensor makes a contact with the fixture 126. In some embodiments, a plurality of piezoelectric sensors can be disposed at various mounting points of the enclosure 122. For example, the enclosure 122 may have four mounting points through which the enclosure 122 can be secured, with mechanical coupling devices (e.g., screws, nuts and bolts, rivets, fasteners, etc.), to the fixture 126. In this example, a piezoelectric sensor can be disposed at each mounting point of the enclosure 122 to determine torque value exerted by the mechanical coupling device at each mounting point.

Figure 2:
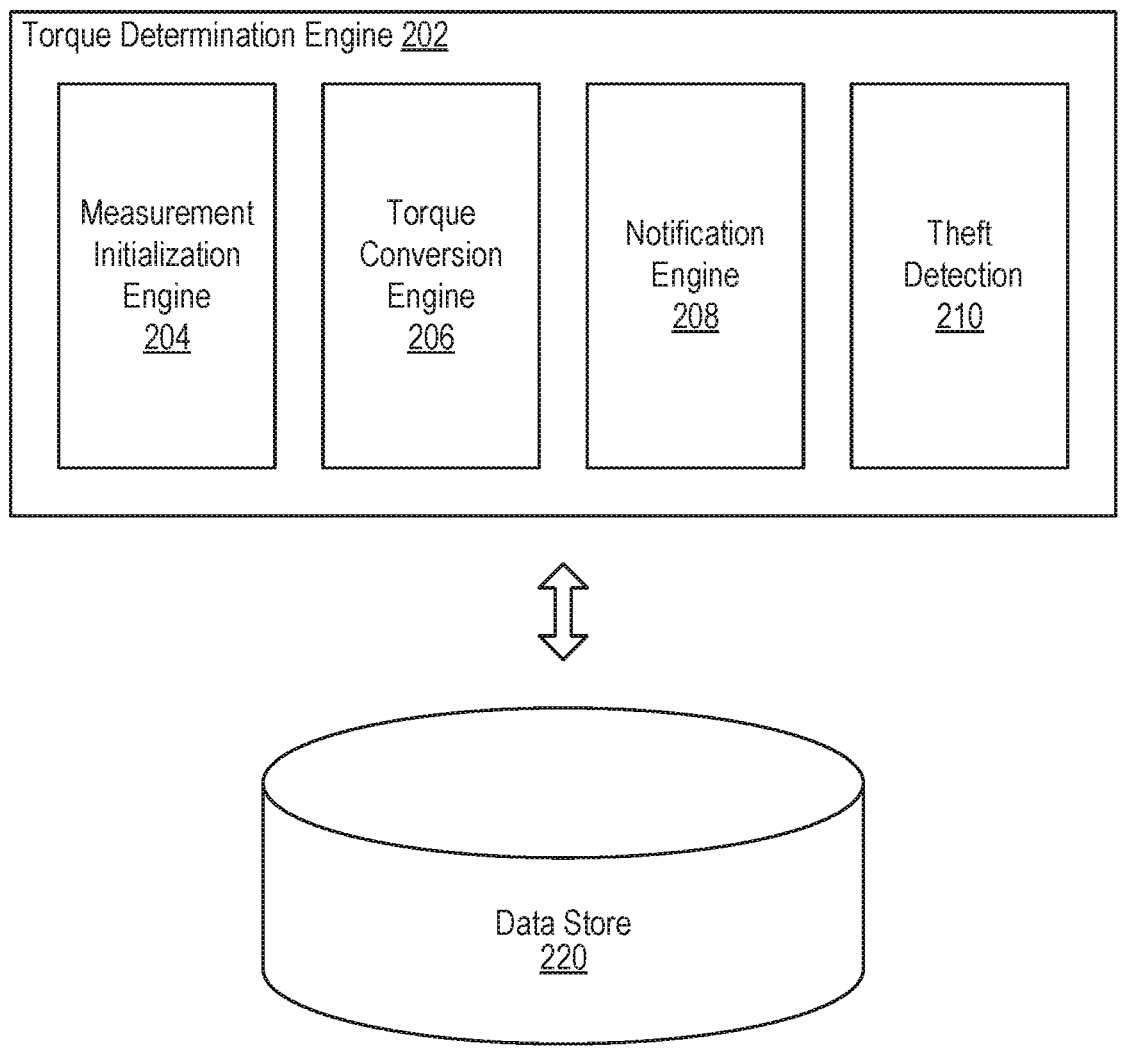
FIG. 2 illustrates an example torque determination system, according to an embodiment of the present disclosure.

FIG. 2 illustrates an example torque determination system 200, according to an embodiment of the present disclosure. The example torque determination system 200 can include a torque determination engine 202 that can further include one or more processors and memory. The processors, in conjunction with the memory, can be configured to perform various operations associated with the torque determination engine 202. For example, the processors and memory can determine torque exerted by a mechanical coupling device to secure an enclosure to a fixture of autonomous vehicle. The torque exerted can be determined based on pressure as measured by a piezoelectric sensor disposed between the enclosure and the fixture. As shown in FIG. 2, in some embodiments, the torque determination engine 202 can include a measurement initialization engine 204, a torque conversion engine 206, a notification engine 208, and a theft detection engine 210. The measurement initialization engine 204, the torque conversion engine 206, the notification engine 208, and the theft detection engine 210 will be discussed in further detail below.

In some embodiments, the torque determination system 200 can additionally include at least one data store 220 that is accessible to the torque determination engine 202. In some embodiments, the data store 220 can be configured to store parameters, data, configuration files, or machine-readable codes of the measurement initialization engine 204, the torque conversion engine 206, the notification engine 206, and the theft detection engine 210.

In general, the torque determination engine 202 can determine a torque value associated with using a mechanical coupling device to secure an enclosure to a fixture of an autonomous vehicle. The torque determination engine 202 can determine the torque value based on pressure measured by a piezoelectric sensor disposed between the enclosure and the fixture. As discussed above, a piezoelectric sensor can measure pressure between two surfaces and can convert this pressure into electrical signal that can be further processed. To do so, an initial pressure measurement from the piezoelectric sensor is "zeroed" or set to an initial value (a baseline value). The torque determination engine 202 can utilize the measurement initialization engine 204 to initialize the electrical signal of the piezoelectric sensor. The measurement initialization engine 204 can establish the initial pressure measurement from the piezoelectric sensor as a baseline or initial value for pressure. Any subsequent changes to pressure between the enclosure and the fixture are measured in relation to the initial value. For example, if the pressure between the enclosure and the fixture is greater than the initial value, the pressure is expressed as some number or value larger than the initial value. As another example, if the pressure between the enclosure and the fixture is less than the initial value, the pressure is expressed as some number or value smaller than the initial value. The measurement initialization engine 204 will be discussed in further detail with respect to FIG. 4A herein.

The torque conversion engine 206 can convert pressure measured by a piezoelectric sensor to torque values. The torque conversion engine 206 can convert pressure to torque values based on a calibration curve. For example, once a piezoelectric sensor has been initialized to an initial value (e.g., "zeroed"), any changes in pressure in relation to the initial value can be expressed as a mathematical function of torque value. For instance, a numerical change in pressure can be expressed as some change in torque value in accordance with the mathematical function. In some embodiments, the calibration curve can be a linear function, a polynomial function, or an exponential function. In some embodiments, the calibration curve can be a combination of the aforementioned functions. In some embodiments, the calibration curve can be implemented as a lookup table. Many variations are possible.

The notification engine 208 can generate a notification based on a torque value. The notification engine 208 can generate a notification once a desired torque value is reached as determined by the torque conversion engine 206. For example, when a mechanical coupling device is tighten to a desired torque value, the notification engine 208 can generate a notification to a user that the desired torque value has been reached. In some embodiments, the notification engine 208 can generate a notification based on an audio cue. For example, the notification engine 208 can emit a discrete sound signature (e.g., a beeping sound) when the desired torque value is reached. In some embodiments, the notification engine 208 can generate a notification based on a visual cue. For example, the notification engine 208 can emit a pulsing light to indicate that the desired torque value is reached. Many variations are possible.

The theft detection engine 210 can detect a sudden or abrupt change in pressure as measured by a piezoelectric sensor. Once the enclosure is secured and properly torqued to the fixture, the theft detection engine 210 can be activated. When activated, the theft detection engine 210 can monitor torque values exerted by the enclosure to the fixture. For example, once an enclosure is secured and properly torqued to a fixture of an autonomous vehicle, the theft detection engine 210 can be activated to continuously monitor, around the clock, torque values exerted by one or more mechanical coupling devices used to secured the enclosure. In some embodiments, the theft detection engine 210 can determine that a theft occurred by measuring a degree or an amount of change between two pressure measurements. For example, at a first time, pressure between an enclosure and a fixture is at a first value. At a second time, some time after the first time, the pressure between the enclosure and the fixture decreases from the first value to a second value. In this example, if the amount of decrease in pressure satisfies some threshold value, it may be an indication for theft and the theft detection engine 210 can send out an alert. In some embodiments, the theft detection engine 210 can determine that a theft occurred by measuring a rate of change in pressure. For example, when an enclosure that has been affixed to a fixture is forcibly removed from the fixture, corresponding pressure may change from a first value to a second value, the second value being less than the first value. If a rate of change from the first value to the second value satisfies some threshold rate, it may be an indication for theft and the theft detection engine 210 can send out an alert. In some embodiments, the theft detection engine 210 can emit an audio to alert others when a theft occurs. For example, the theft detection engine 210 can emit a loud, ear piercing sound (e.g., a siren) to alert others of the theft. In some embodiments, the theft detection engine 210 can emit light to alert others when a theft occurs. For example, the theft detection engine 210 can turn on lights (e.g., headlights, taillights, etc.) to alert others of the theft. In some cases, the lights can pulsate at a particular frequency (e.g., twice a second, three times a second, etc.). In some embodiments, the theft detection engine 210 can use on-board cameras (e.g., cameras encased by an enclosure) to pictures. For example, an indication of theft, the theft detection engine 210 can instruct cameras in the enclosure to take pictures in hops of capturing photos of the perpetrator. In some cases, these photos can be transmitted via a network connection to an entity, such as an autonomous vehicle fleet operator. In some embodiments, the theft detection engine 210 can inform the autonomous vehicle fleet operator of the theft. For example, the theft detection engine 210 can transmit a signal, via the network connection, such as a cellular network, to the autonomous vehicle fleet operator to inform the operator of the theft. In some cases, the theft detection engine 210 can automatically report the theft to government authorities, such as a local police. In some embodiments, the theft detection engine 210 may track location of the enclosure. For example, an enclosure may be embedded with a global positioning system (GPS). In this example, the theft detection engine 210 may use the GPS included in the enclosure to help track down the enclosure if the enclosure was unauthorizedly removed. The theft detection engine 210 will be discussed in further detail with respect to FIG. 4B herein.

Figure 3A:
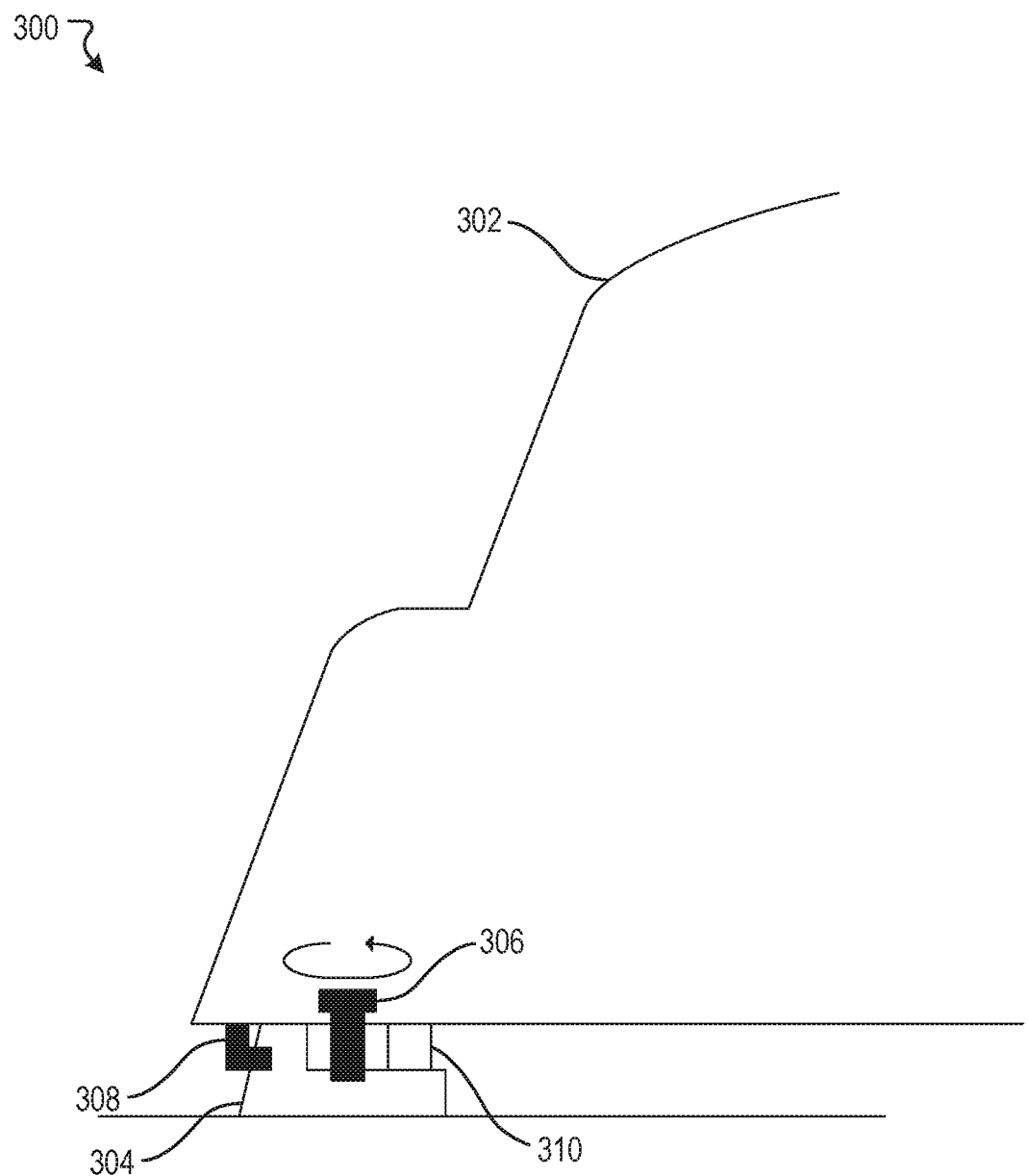
FIG. 3A illustrates a cross-sectional view of an example torque determination system, according to an embodiment of the present disclosure.

FIG. 3A illustrates a cross-sectional view of an example torque determination system 300, according to an embodiment of the present disclosure. FIG. 3A depict a scenario in which an enclosure is being translated and secured to a final alignment location on a fixture of an autonomous vehicle. As depicted, the torque determination system 300 includes an enclosure 302 mounted to a fixture 304 of an autonomous vehicle through one or more clamps (e.g., a clamp 308) at one or more mounting points associated with the enclosure 302. The one or more clamps allows the enclosure 302 to translate (e.g., move, glide, etc.) to a final alignment location along the fixture 304. In some embodiments, the enclosure 302 can include a piezoelectric sensor 310, disposed between the enclosure 302 and the fixture 304, underneath the enclosure 302, at each mounting point. The piezoelectric sensor 310 can measure pressure exerted by the enclosure 302 to the fixture 304. Once the enclosure 302 has been translated to the final alignment location, the piezoelectric sensor 310 can be zeroed or initialized to an initial value. This initialization allows the piezoelectric sensor 310 to measure pressure changes relative to the initial value. The enclosure 302 can be secured to the fixture 304 at the final alignment location using one or more mechanical coupling devices (e.g., a mechanical coupling device 306). The one or more mechanical coupling devices can be screws, nuts and bolts, rivets, fasteners, or Velcro, for example. As the one or more mechanical coupling devices are tightened to secure the enclosure 302, the pressure exerted by the enclosure 302 to the fixture 304 at each mounting point, as measured by the piezoelectric sensor 310, increases. This pressure can be converted to a torque value using a calibration curve as discussed with respect to FIG. 2. In some embodiments, once the torque value at each mounting point reaches a certain desired toque value, the torque determination system 300 can emit an audio cue informing that a mechanical coupling device (i.e., the mechanical coupling device 306) corresponding to a piezoelectric sensor (i.e., the piezoelectric sensor 310) has been tightened to the desired torque value. In some cases, instead of an audio cue, a visual cue, such as blinking lights, can be emitted. Many variations are possible.

Figure 3B:
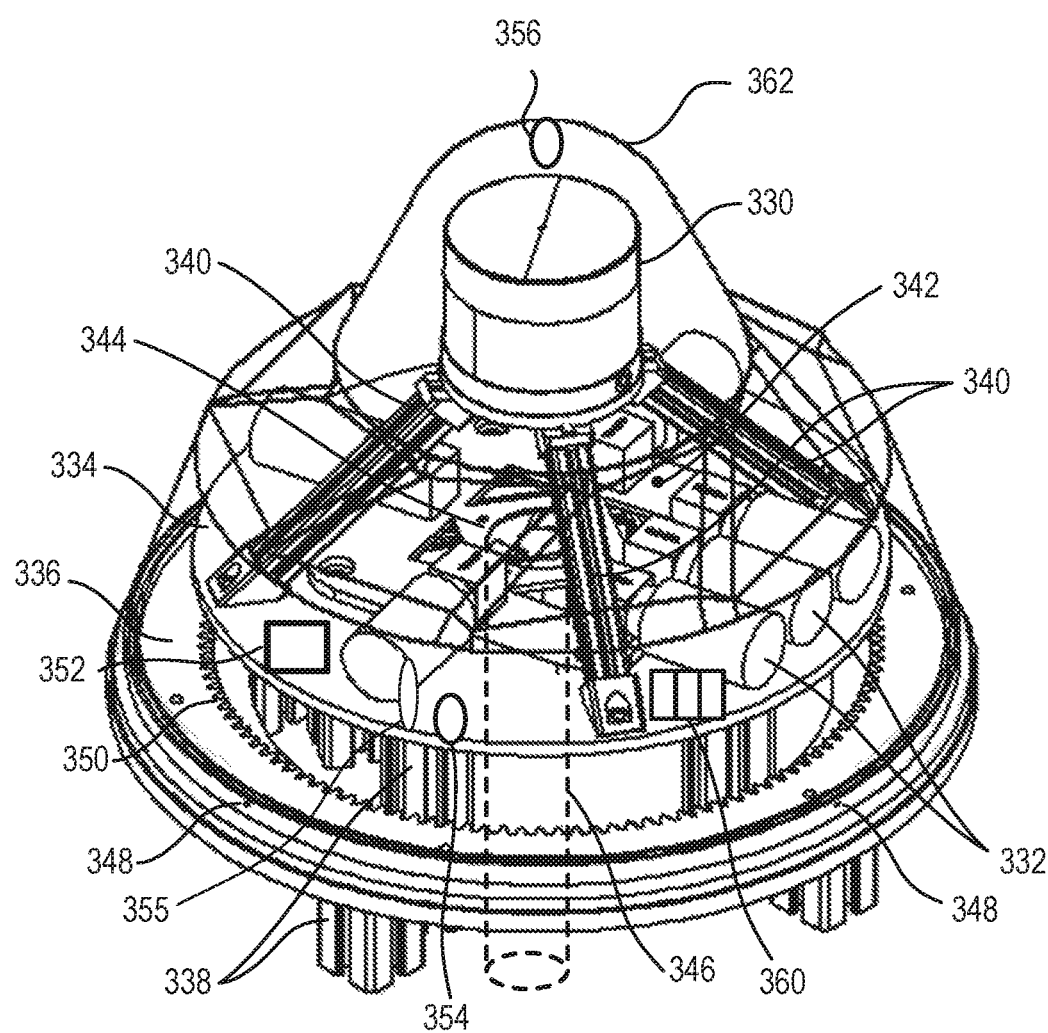
FIG. 3B illustrates an example of an enclosure for a sensor system according to an embodiment of the present disclosure.

FIG. 3B illustrates an example of an enclosure 320 for a sensor system according to an embodiment of the present disclosure. The enclosure 320 may be implemented as enclosure 302, for example. FIG. 3B may include a cover 362 to encase a sensor system, which may include LiDAR sensor 330 and cameras 332. For example, the cover 362 may be detachable or removable to allow easy access to the sensor system. In some embodiments, the cover 362 can rotate circularly, or in three hundred sixty degrees, relative to the sensor system about a central vertical axis of the cover 362. In some embodiments, the cover 362 may have a profile or shape that has a low wind resistance or coefficient of drag, and thereby reducing negative impacts to fuel economy of the autonomous vehicle. For example, the cover 362 may have a smooth surface so that a boundary layer formed between the air and the cover 362 would be laminar rather than turbulent. For example, the cover 362 may have a sleek angular profile. In some embodiments, the outer contour of the cover 362 can have multiple distinct sections (e.g., portions, regions, etc.) with different shapes. For example, a top portion of the cover 362 may have a circular dome shape with a first diameter measured at a base of the top portion and may encase the LiDAR sensor 330 of the autonomous vehicle. A middle portion of the cover 362 directly below the top portion may have a trapezoidal or truncated cone shape with a second diameter measured at a base on the middle portion, and the second diameter may be larger than the first diameter. A lower portion of the cover 362 directly below the middle portion may have a trapezoidal or truncated cone shape with a third diameter measured at a base on the lower portion. The third diameter may be larger than the second diameter. In other embodiments, the cover 362 may be entirely comprised of a single shape, such as a circular dome shape, a trapezoidal or truncated cone shape.

The cover 362 may be made from any suitable material that allows the one or more sensors of the enclosure 320 to properly function while shielding the one or more sensors from environmental elements (e.g., rain, snow, moisture, wind, dust, radiation, oxidation, etc.). Further, the suitable material must be transparent to wavelengths of light or electro-magnetic waves receptive to the LiDAR sensor 330 and the plurality of cameras 332. For example, for the LiDAR sensor 330 to properly operate, the cover 362 must allow laser pulses emitted from the LiDAR sensor 330 to pass through the cover 362 to reach a target and then reflect back through the cover 362 and back to the LiDAR sensor 330. Similarly, for the plurality of cameras 332 to properly operate, the cover 362 must allow visible light to enter. In addition to being transparent to wavelengths of light, the suitable material must also be able to withstand potential impacts from roadside debris without causing damages to the LiDAR sensor 330 or the plurality of cameras 332. In an implementation, the cover 362 can be made of acrylic glass (e.g., Cylux, Plexiglas, Acrylite, Lucite, Perspex, etc.). In another implementation, the cover 362 can be made of strengthen glass (e.g., Coring® Gorilla® glass). In yet another implementation, the cover 362 can be made of laminated safety glass held in place by layers of polyvinyl butyral (PVB), ethylene-vinyl acetate (EVA), or other similar chemical compounds. Many implementations are possible and contemplated.

In some embodiments, the cover 362 can be tinted with a thin-film neural filter to reduce transmittance of light entering the cover 362. For example, in an embodiment, a lower portion of the cover 362 can be selectively tinted with the thin-film neutral filter to reduce an intensity of visible light seen by the plurality of cameras 332. In this example, transmittance of laser pulses emitted from the LiDAR sensor 330 is not be affected by the tint because only the lower portion of the cover 342 is tinted. In another embodiment, the lower portion of the cover 362 can be tinted with a thin-film graduated neural filter in which the transmittance of visible light can vary along an axis. In yet another embodiment, the whole cover 362 can be treated or coated with a reflective coating such that the components of the enclosure 320 is not visible from an outside vantage point while still being transparent to wavelengths of light receptive to the LiDAR sensor 330 and the plurality of cameras 332. Many variations, such as adding a polarization layer or an anti-reflective layer, are possible and contemplated.

In some embodiments, the enclosure 320 may comprise a frame 334, a ring 336, and a plurality of anchoring posts 338. The frame 334 provides mechanical support for the LiDAR sensor 330 and the plurality of cameras 332. The ring 336 provides mounting points for the cover 362 such that the cover 362 encases and protects the sensor system from environmental elements. The plurality of anchoring posts 338 provides mechanical couplings to secure or mount the enclosure 320 to the autonomous vehicle.

In some embodiments, the frame 334 may have two base plates held in place by struts 340. An upper base plate of the frame 334 may provide a mounting surface for the LiDAR sensor 330 while a lower base plate of the frame 334 may provide a mounting surface for the plurality of cameras 332. In general, any number of LiDAR sensors 330 and cameras 332 may be mounted to the frame 334. The frame 334 is not limited to having one LiDAR sensor and six cameras as shown in FIG. 3B. For example, in an embodiment, the frame 334 can have more than two base plates held in place by the struts 340. In this example, the frame 334 may have three base plates with upper two base plates reserved for two LiDAR sensors 330 and a lower base plate for six cameras 332. In another embodiment, the lower base plate can have more than six cameras 332. For instance, there can be three cameras pointed in a forward direction of an autonomous vehicle, two cameras pointed to in a right and a left direction of the autonomous vehicle, and two cameras pointed in a reverse direction of the autonomous vehicle. Many variations are possible.

The frame 334 may include a temperature sensor 342, a fan 344, an air conditioning (AC) vent or cabin vent 346, and a pressure sensor 355. The temperature sensor 342 can be configured to measure a temperature of the enclosure 320. In general, the temperature sensor 342 can be placed anywhere on the frame 334 that is representative of the enclosure temperature. In a typical implementation, the temperature sensor 342 is placed in a region in which heat generated by the LiDAR sensor 330 and the plurality of cameras 332 are most localized. In the example of FIG. 3B, the temperature sensor 342 is placed on the lower base plate of the frame 334, right behind the three front cameras. The fan 344 can be configured to draw an inlet airflow from an external source. The fan 344, in various implementations, works in conjunction with the temperature sensor 342 to maintain a steady temperature condition inside the enclosure 320. The fan 344 can vary its rotation speed depending on the enclosure temperature. For example, when the enclosure temperature is high, as measured by the temperature sensor 342, the fan 344 may increase its rotation speed to draw additional volume of air to lower the temperature of the enclosure 320 and thus cooling the sensors. Similarly, when the temperature of the enclosure 320 is low, the fan 344 does not need to operate as fast. The fan 344 may be located centrally on the lower base plate of the frame 334. The AC vent or cabin vent 346 may be a duct, tube, or a conduit that conveys cooling air into the enclosure 320. In an embodiment, the AC vent or cabin vent 346 may be connected to a cabin of the autonomous vehicle. In another embodiment, the AC vent or cabin vent 346 may be connected to a separate air conditioner unit that provides cooling air separate from the cabin of the autonomous vehicle. The AC vent or cabin vent 346 may be directly connected to the enclosure 320 at a surface of the frame 334. The pressure sensor 355 may be configured to determine an internal air pressure of the enclosure 320.

In some embodiments, the frame 334 can also include a powertrain. The powertrain is an electric motor coupled to a drivetrain comprising one or more gears. The powertrain can rotate the ring 336 clockwise or counter-clockwise. In various embodiments, the electric motor can be a direct current brush or brushless motor, or an alternate current synchronous or asynchronous motor. Many variations are possible. In various embodiments, the one or more gears of the drivetrain can be configured to have various gear ratios designed to provide various amounts of torque delivery and rotational speed.

In general, the frame 334 can be made from any suitable materials that can withstand extreme temperature swings and weather various environmental conditions (e.g., rain, snow, corrosion, oxidation, etc.). The frame 334 can be fabricated using various metal alloys (e.g., aluminum alloys, steel alloys, etc.). The frame 334 can also be fabricated with three dimensional printers using thermoplastics (e.g., polylactic acid, acrylonitrile butadiene styrene, polyamide, high impact polystyrene, thermoplastic elastomer, etc.). Similarly, the air duct 346 can be made from rigid materials (e.g., hard plastics, polyurethane, metal alloys, etc.) or semi-rigid materials (e.g., rubber, silicone, etc.). Many variations are possible.

The ring 336 can provide mounting points for the cover 362 to encase the internal structure 304 of the enclosure 320. In the example of FIG. 3B, the ring 336 has an outer portion that includes attaching points 348 through which the cover 362 can be attached and secured. The ring 336 also has an inner portion that comprises gear teeth 350 (or cogs) such that when the gear teeth 350 is driven by the powertrain of the frame 334, the whole ring 336 rotates as a result.

Similar to the frame 334, the ring 336 can be made from any suitable material that can withstand extreme temperature swings and weather various environmental conditions. However, in most implementations, the suitable material for the ring 336 must be somewhat more durable than the material used for the frame 334. This is because the gear teeth 350 of the ring 336 are subject to more wear and tear from being coupled to the powertrain of the frame 334. The ring 336 can be fabricated using various metal alloys (e.g., carbon steel, alloy steel, etc.). The ring 336 can also be fabricated with three dimensional printers using thermoplastics (e.g., polylactic acid, acrylonitrile butadiene styrene, polyamide, high impact polystyrene, thermoplastic elastomer, etc.).

The plurality of the anchoring posts 338 can provide mechanical couplings to secure or mount the enclosure 320 to an autonomous vehicle. In general, any number of anchoring posts 338 may be used. In the example of FIG. 3B, the enclosure 320 is shown with eight anchoring posts: four anchoring posts to secure the frame 334 to the autonomous vehicle and four anchoring posts to secure the ring 336 to the autonomous vehicle. Similar to the frame 334 and the ring 336, the plurality of the anchoring posts 338 can be made from any suitable materials and fabricated using metal alloys (e.g., carbon steel, alloy steel, etc.) or three dimensional printed with thermoplastics (e.g., polylactic acid, acrylonitrile butadiene styrene, polyamide, high impact polystyrene, thermoplastic elastomer, etc.).

A first vent 354 and/or a second vent 356 may be disposed on the cover 362. For example, the first vent 354 may be disposed on near the frame 344 or between the upper base plate of the frame 334 and the lower base plate of the frame 334. For example, the second vent 356 may be disposed at or near the top of the cover 362. The first vent 354 allows air from outside to flow into the enclosure 320, and may be used to prevent humidification and/or overheating. The second vent 356 allows warm/hot air to be expelled from the enclosure 320. The first vent 354 and/or the second vent 356 may be conducive to laminar flow of air. For example, a boundary layer created by the air entering and the first vent 354 would be laminar so that the boundary layer does not create turbulent flow. The first vent 354 and/or the second vent 356 may comprise a smooth orifice, and may be shaped to have a circular or elliptical cross section. The first vent 354 and/or the second vent 356 may be shaped so that the Reynolds number of air flowing through the second vent 356 may be at most 2000, to create laminar flow. In some embodiments, the Reynolds number of air flowing through the first vent 354 and/or the second vent 356 may be at most 3000, or at most 1000.

A controller 352 may be disposed on the frame 334, the upper base plate of the frame 334, or the lower base plate of the frame 334. The controller 352 may control the operations of one of more of the LiDAR sensor 330, the cameras 332, the temperature sensor 342, the fan 344, the AC vent or cabin vent 346, the first vent 354, and/or the second vent 356.

For example, the controller 352 may regulate a rotation speed of the fan 344 based on a speed of the vehicle, a temperature measured by the temperature sensor 342, an external temperature, or a difference between the temperature measured by the temperature sensor 342 and the external temperature, and operate the fan 344 at the regulated rotation speed. For example, the controller 352 may regulate a rotation speed of the fan 344 based on any combination of the aforementioned factors. As an example, the controller 352 may regulate a rotation speed of the fan 344 based on whether the access from the enclosure 320 to the AC vent or cabin vent 346 is turned on. For example, the controller 352 may increase or decrease a rotation speed of the fan 344 if the access from the enclosure 320 to the AC vent or cabin vent 346 is turned off (e.g., no air flows from the AC vent or cabin vent 346 to the enclosure 320). For example, the controller 352 may increase or decrease a rotation speed of the fan 344 if the access from the enclosure 320 if the access from the enclosure 320 to the AC vent or cabin vent 346 is turned on. For example, the controller 352 may regulate a rotation speed of the fan 344 based on a level of wind external to the enclosure 320. For example, the level of wind may be determined by an amount of airflow entering through the first vent 354. For example, if enough air is entering through the first vent 354 to provide cooling and/or ventilation, the controller 352 may reduce the rotation speed of the fan 344 or shut off the fan 344. Furthermore, the controller 352 may, in addition to, or instead of, regulating the rotation speed of the fan 344, regulate an amount of air entering from the AC vent or cabin vent 346, for example, depending or based on how much cooling is required for one or more of the sensors of the enclosure 320. For example, the controller 352 may regulate the amount of air entering into the AC vent or cabin vent 346 based on one or more of, or any combination of, the speed of the autonomous vehicle, the temperature measured by the temperature sensor 342, the external temperature, the difference between the temperature measured by the temperature sensor 342 and the external temperature, or based on an internal temperature of the LiDAR sensor 330 or the cameras 332 (which may indicate how heavily the LiDAR sensor 330 or the cameras 332 are being used). For example, the controller 352 may regulate the amount of air entering into the AC vent or cabin vent 346 by adjusting a size of an opening of the AC vent or cabin vent 346 (e.g., a radius of the opening of the AC vent or cabin vent 346, or by regulating an amount of air extracted into the AC vent or cabin vent 346. In another embodiment, the controller 352 may regulate an amount of air entering from the AC vent or cabin vent 346 based on the rotation speed of the fan 344. For example, in one embodiment, if the rotation speed of the fan 344 is increased, the controller 352 may reduce the amount of air entering into the AC vent or cabin vent 346 because adequate cooling of the enclosure 320 may already be provided by the fan 344. In one embodiment, the controller 352 may select between using the fan 344 and the AC vent or cabin vent 346 to cool the enclosure 320. For example, the controller 352 may select between using the fan 344 and the AC vent or cabin vent 346 to cool the enclosure 320 based on which method is more energy efficient. In one embodiment, the controller 352 may select using the fan 344 when an amount of cooling to be provided (e.g. which may correspond to the temperature measured by temperature sensor 342) is lower than a threshold (e.g., first threshold) and using the AC vent or cabin vent 346 when the amount of cooling to be provided is greater than the threshold (e.g., first threshold). On the other hand, if the operation of the fan 344 at high rotation speed itself generates heat internally for the fan 344, the controller 352 may increase the amount of air entering into, or permit air to enter through, the AC vent or cabin vent 346 to provide cooling for the fan 344. Thus, the controller 352 may increase the amount of air entering into the AC vent or cabin vent 346 as the rotation speed of the fan 344 is increased.

The controller 352 may further be configured to turn on or turn off access from the AC vent or cabin vent 346 to the enclosure 320 based on the temperature of the enclosure 320 measured by the temperature sensor 342 or the internal air pressure of the enclosure 320 measured by the pressure sensor 355. For example, an increase in the internal temperature of the enclosure 320 may result in changes in internal air pressure of a portion of the enclosure 320 because warmer air rises. To compensate for changes in the temperature and/or pressure inside the enclosure 320, the AC vent or cabin vent 346 may be turned on to allow AC air or cabin air to flow into the AC vent or cabin vent 346. Furthermore, the controller 352 may be configured to increase or decrease an amount of AC air or cabin air going into the enclosure 320, for example, by increasing or decreasing a size of the AC vent or cabin vent 346. In another embodiment, the controller 352 may be configured to increase or decrease an amount of AC air or cabin air, for example, based on a gradient of temperature inside the enclosure 320 or a gradient of pressure inside the enclosure 320. As an example, if a gradient of temperature inside the enclosure 320 exceeds a threshold (e.g., second threshold), the controller 352 may be configured to increase or decrease an amount of AC air or cabin air. As an example, if a gradient of pressure inside the enclosure 320 exceeds a threshold (e.g., third threshold), the controller 352 may be configured to increase or decrease an amount of AC air or cabin air.

The controller 352 may further adjust a rotation speed of the fan 344, and/or an amount of air entering the AC vent or cabin vent 346, based on one or any combination of predicted future conditions, such as anticipated speed, anticipated external temperature, or anticipated internal temperature of the enclosure 320. For example, if the controller 352 predicts, based on a navigation route selected, or weather forecast, that the temperature at a destination is high, the controller may preemptively precool the enclosure 320 by increasing the rotation speed of the fan 344 or increasing the amount of air entering the AC vent or cabin vent 346. As another example, if the controller 352 predicts that the LiDAR sensor 330 or the cameras 332 will be heavily used in a near future, the controller may preemptively precool the enclosure 320 by increasing the rotation speed of the fan 344 or increasing the amount of air entering the AC vent or cabin vent 346. As another example, if the controller 352 predicts that the vehicle speed will increase based on a type of road (e.g., highway), traffic conditions, road conditions, and/or amount of battery/gasoline remaining, the controller may preemptively precool the enclosure 320 by increasing the rotation speed of the fan 344 or increasing the amount of air entering the AC vent or cabin vent 346.

Optionally, the enclosure 320 also comprises a filter 360, or one or more filters 360, to filter debris. In one embodiment, the filter 360 is a HEPA filter. The one or more filters 360 may be disposed on an upper base plate of the frame 334, a lower base plate of the frame 334, or the frame 334. Additionally or alternatively, the one or more filters 360 may be disposed at an inlet of the first vent 354. The activity of the filter 360 may be controlled by the controller 352. For example, if a detected level of debris is high, the controller 352 may increase an activity level of the filter 360 (e.g. a heavy-duty mode). In contrast, if a detected level of debris is low, the controller 352 may decrease an activity level of the filter 360 (e.g. a light-duty mode). The filter 360 may further be adjusted to filter out particles of specific ranges of sizes (e.g., by the controller 352).

Figure 4A:
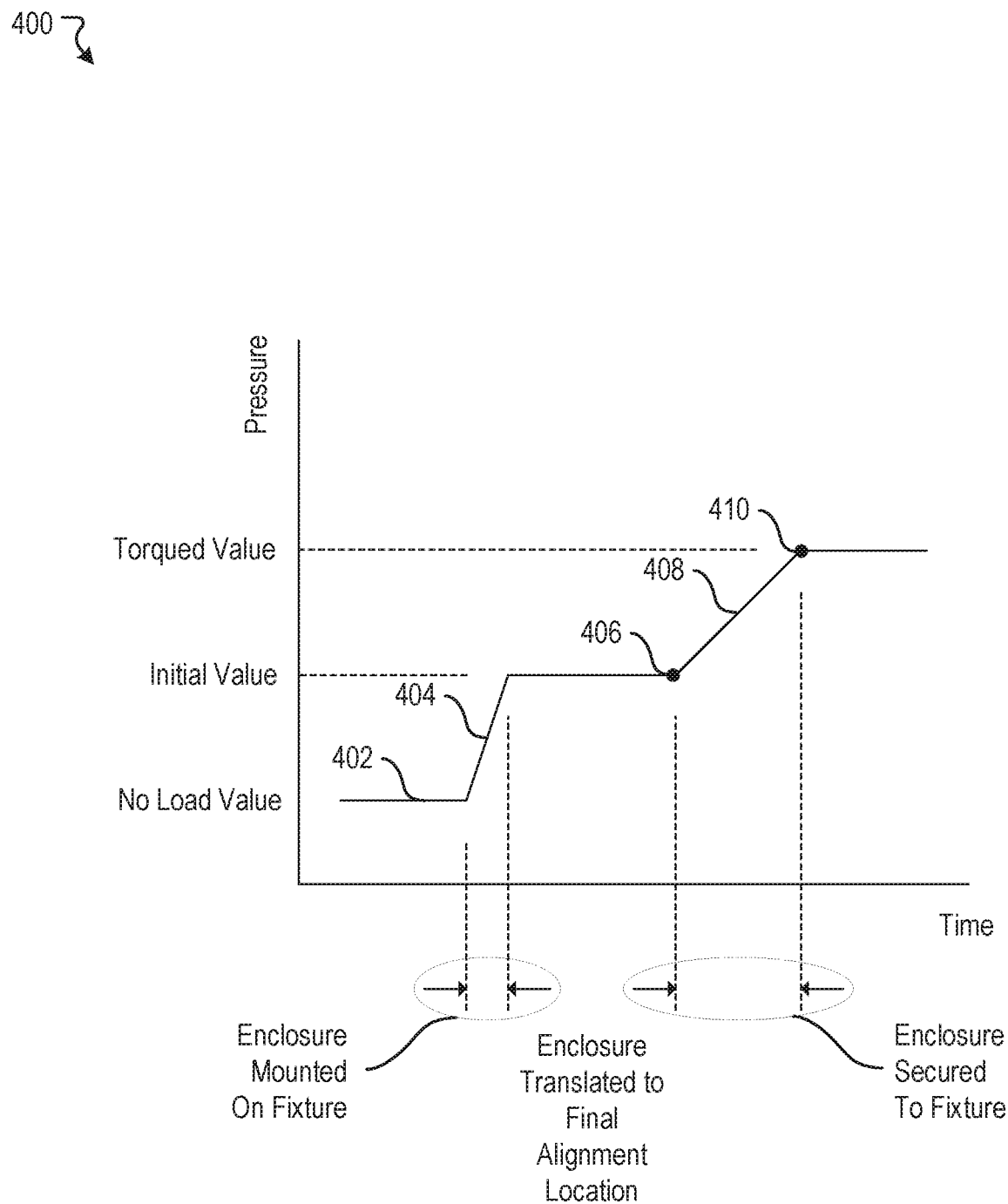
FIG. 4A illustrates a torque measurement scenario, according to an embodiment of the present disclosure.

FIG. 4A illustrates a torque measurement scenario 400, according to an embodiment of the present disclosure. FIG. 4A depicts a scenario in which an enclosure is being translated and secured to a final alignment location on a fixture of an autonomous vehicle. In various embodiments, the enclosure can include one or more piezoelectric sensors at one or more mounting points of the enclosure. An example x-y plot is presented in FIG. 4A. The x-y plot can represent a plot of pressure data measured by a piezoelectric sensor over a period of time spanning an alignment process for the enclosure. An x-axis of the x-y plot represents time. A y-axis of the x-y plot represents pressure data measured over the period of time spanning the alignment process. In the scenario 400 depicted, a region 402 on the plot corresponds to pressure data measured by the piezoelectric sensor (e.g., the piezoelectric sensor 310 of FIG. 3A) while the enclosure has not been mounted to the fixture. This pressure data (e.g., the region 402) represents no load value because the enclosure has not been mounted to the fixture. Once the enclosure is mounted to the fixture, the pressure data measured by the piezoelectric sensor increases due to pressure exerted by the enclosure to the fixture. This increase of pressure data is represented by a region 404 on the plot. At some time later, after the enclosure has been translated to the final alignment location, the pressure data from the piezoelectric sensor is "zeroed" or set to an initial value indicated by a point 406 on the plot. As the enclosure is secured with one or more mechanical coupling devices (e.g., screws, nuts and bolts, rivets, fasteners, etc.), the pressure data measured by the piezoelectric sensor increases again as indicated by a region 408 on the plot. This pressure data (e.g., the region 408) can be converted to torque values. As the one or more mechanical coupling devices are tightened, at some point, the pressure data as measured by the piezoelectric sensor will correspond to a desired torque value as indicated a point 410 on the plot. At this time, an audio or visual cue can be emitted to indicate that the desired torque value has been reached and the one or more mechanical coupling devices no longer need to be tightened.

Figure 4B:
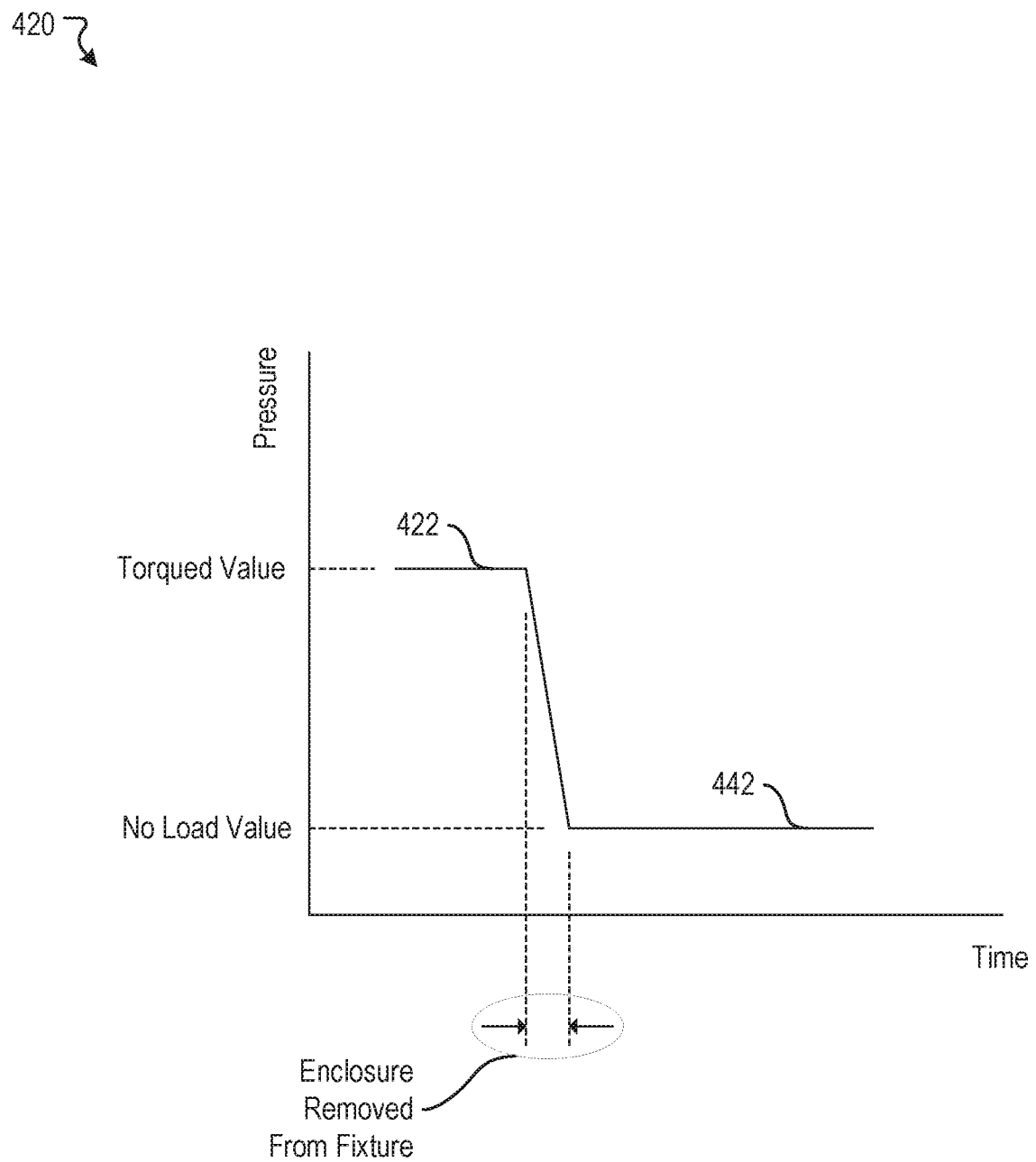
FIG. 4B illustrates a theft detection scenario, according to an embodiment of the present disclosure.

FIG. 4B illustrates a theft detection scenario 420, according to an embodiment of the present disclosure. FIG. 4B describes a scenario in which an enclosure is unauthorizedly removed from a fixture of an autonomous vehicle. An example x-y plot is presented in FIG. 4B. The x-y plot can represent a plot of pressure data measured by a piezoelectric sensor over some period of time. Similar to FIG. 4A, an x-axis of the x-y plot represents time and an y-axis of the x-y plot represents pressure or pressure data. In this scenario 420, the enclosure is already secured and properly torqued to the fixture as indicated by a region 422 of the plot (e.g., "Torqued Value"). If the enclosure is removed from the fixture, the enclosure no longer exerts pressure to the fixture, and correspondingly, pressure data changes in response to the removal of the enclosure (e.g., "Enclosure Removed From Fixture"). The pressure data as measured by the piezoelectric sensor reverts back to a pressure value indicated by a region 442 of the plot (e.g., "No Load Value"). This pressure value indicates an absence of pressure between the enclosure and the fixture, thus an indication that enclosure has been removed from the fixture.

Figure 5:
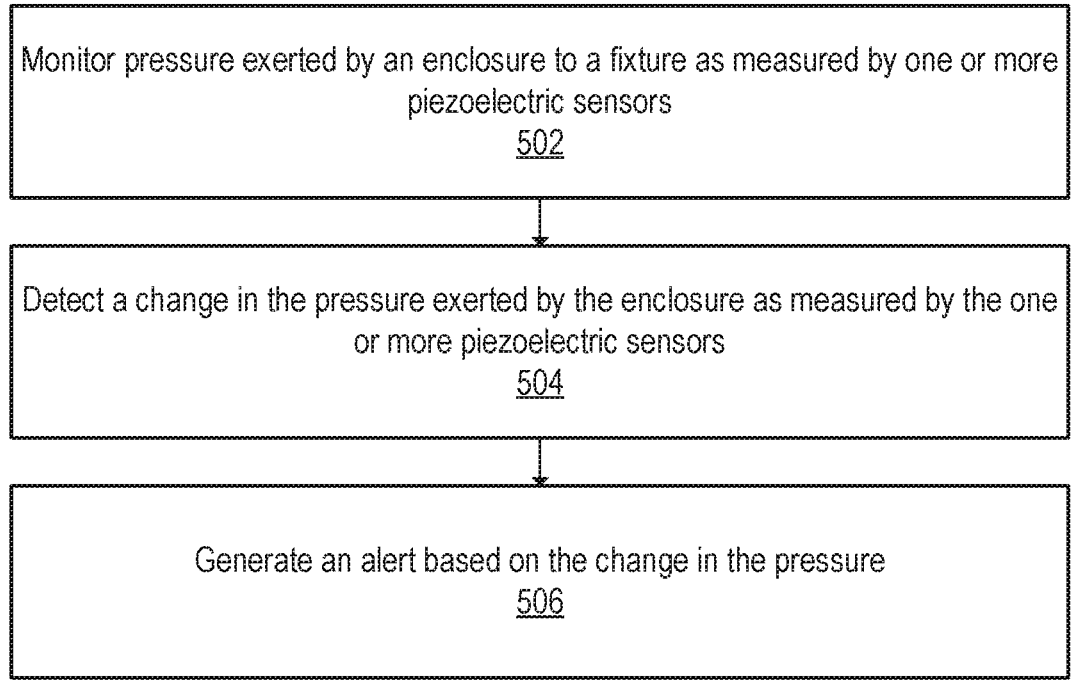
FIG. 5 illustrates an example method, according to an embodiment of the present disclosure.

FIG. 5 illustrates an example method 500, according to an embodiment of the present disclosure. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, pressure exerted by the enclosure to a fixture as measured by one or more piezoelectric sensors can be monitored. At block 504, a change in the pressure exerted by the enclosure as measured by the one or more piezoelectric sensors can be detected. At block 506, an alert can be generated based on the change in the pressure.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
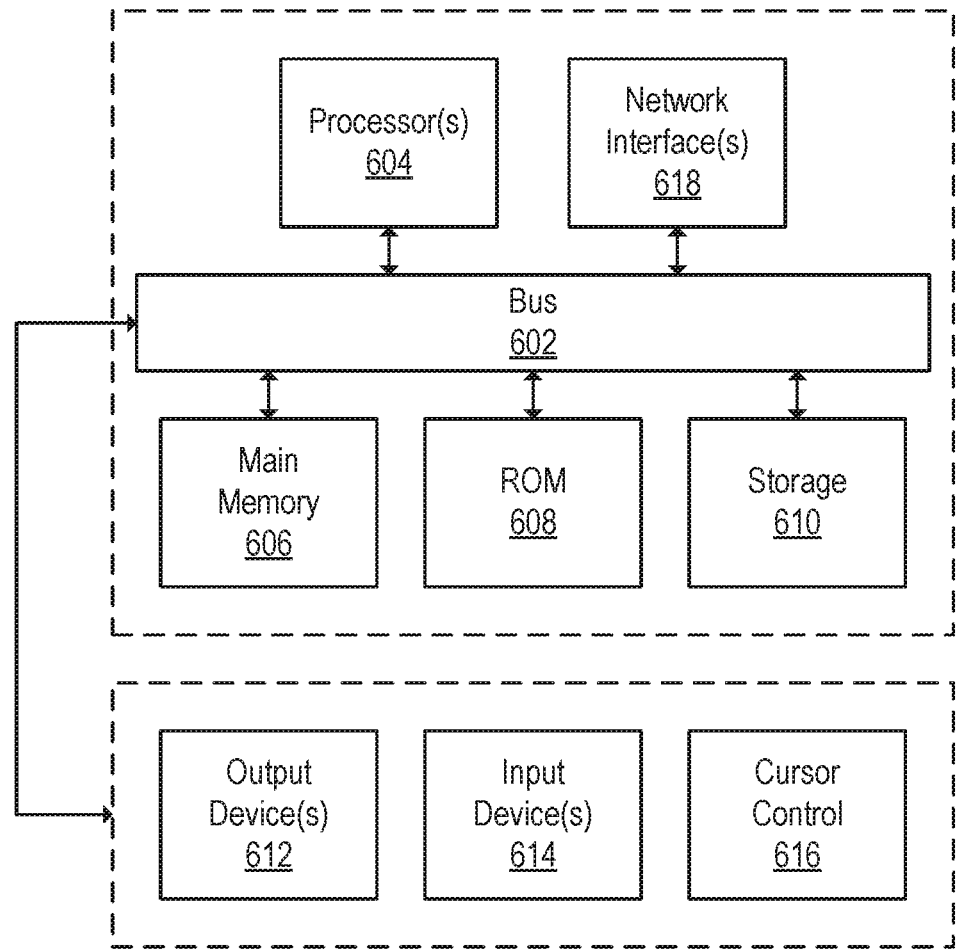
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for detecting a potential theft of an enclosure atop a vehicle, comprising:
    determining, using piezoelectric sensors disposed between an enclosure that encases an image sensor atop the vehicle and a fixture coupled to the enclosure at respective mounting points, strains associated with the enclosure or the fixture at the respective mounting points, the strains comprising a first strain at a first time and a second strain at a second time subsequent to the first time;
    determining, by one or more processors of the vehicle, an amount of change of the strains from the first time to the second time; and
    in response to the amount of change satisfying a threshold rate, generating an alert by the one or more processors in the vehicle.

2. The method of claim 1, further comprising:
converting the strains into respective torque values exerted by mechanical couplings at the respective mounting points.

3. The method of claim 1, wherein the generating the alert comprises:
turning on headlights and taillights at a particular frequency in response to the amount of change satisfying a threshold amount.

4. The method of claim 1, further comprising:
capturing photos of the enclosure in response to the amount of change satisfying a threshold amount.

5. The method of claim 1, further comprising:
detecting a rate of change of the strains from the first time to the second time; and
in response to the rate of change satisfying a threshold rate, generating the alert.

6. The method of claim 1, further comprising:
regulating a rotation speed of a fan disposed inside the enclosure based on a speed of the vehicle or a difference between a temperature inside the enclosure and a temperature outside the enclosure.

7. The method of claim 1, further comprising:
regulating an amount of air entering the enclosure from a cabin vent based on a rotation speed of a fan disposed inside the enclosure, the cabin vent connected to a cabin and the enclosure of the vehicle.

8. The method of claim 1, further comprising:
regulating an amount of air entering the enclosure from a cabin vent based on an internal air pressure of the enclosure, the cabin vent connected to a cabin and the enclosure of the vehicle.

9. The method of claim 1, further comprising:
adjusting a rotation speed of a fan disposed inside the enclosure based on a predicted future speed of the vehicle.

10. The method of claim 1, further comprising:
regulating an amount of air entering the enclosure from a cabin vent based on a predicted future speed of the vehicle, the cabin vent connected to a cabin and the enclosure of the vehicle.

11. A system for detecting a potential theft of an enclosure atop a vehicle, comprising:
an enclosure encasing an image sensor atop a vehicle;
a fixture coupled to the enclosure at respective mounting points;
piezoelectric sensors disposed between the enclosure and the fixture at the respective mounting points and configured to determine strains associated with the enclosure or the fixture at the respective mounting points, the strains comprising a first strain at a first time and a second strain at a second time subsequent to the first time; and
one or more processors of the vehicle configured to:
determine an amount of change of the strains from the first time to the second time; and
in response to the amount of change satisfying a threshold rate, generate an alert.

12. The system of claim 11, further comprising:
mechanical couplings disposed at the respective mounting points and configured to couple the fixture to the enclosure; and the one or more processors are further configured to:
convert the strains into respective torque values exerted by the mechanical couplings at the respective mounting points.

13. The system of claim 11, wherein the generating the alert:
turn on headlights and taillights at a particular frequency in response to the amount of change satisfying a threshold amount.

14. The system of claim 11, wherein the one or more processors are further configured to:
capture photos of the enclosure in response to the amount of change satisfying a threshold amount.

15. The system of claim 11, wherein the one or more processors are further configured to:
detect a rate of change of the strains from the first time to the second time; and
in response to the rate of change satisfying a threshold rate, generate the alert.

16. The system of claim 11, further comprising:
a fan disposed inside the enclosure; and wherein the one or more processors are further configured to:
regulate a rotation speed of the fan disposed inside the enclosure based on a speed of the vehicle or a difference between a temperature inside the enclosure and a temperature outside the enclosure.

17. The system of claim 11, further comprising:
a fan disposed inside the enclosure; and
a cabin vent connected to a cabin and the enclosure of the vehicle; and wherein the one or more processors are further configured to:
regulate an amount of air entering the enclosure from the cabin vent based on a rotation speed of the fan disposed inside the enclosure.

18. The system of claim 11, further comprising:
a cabin vent connected to a cabin and the enclosure of the vehicle; and wherein the one or more processors are further configured to:
regulate an amount of air entering the enclosure from the cabin vent based on an internal air pressure of the enclosure.

19. The system of claim 11, further comprising:
a fan disposed inside the enclosure; and wherein the one or more processors are further configured to:
adjust a rotation speed of the fan based on a predicted future speed of the vehicle.

20. The system of claim 11, further comprising:
a cabin vent connected to a cabin and the enclosure of the vehicle; and wherein the one or more processors are further configured to:
regulate an amount of air entering the enclosure from a cabin vent based on a predicted future speed of the vehicle.

* * * * *